Sept. 8, 1964     E. J. MERCILLE     3,147,936
DUAL CONFIGURATION VEHICLE
Filed Sept. 27, 1960                                5 Sheets-Sheet 1
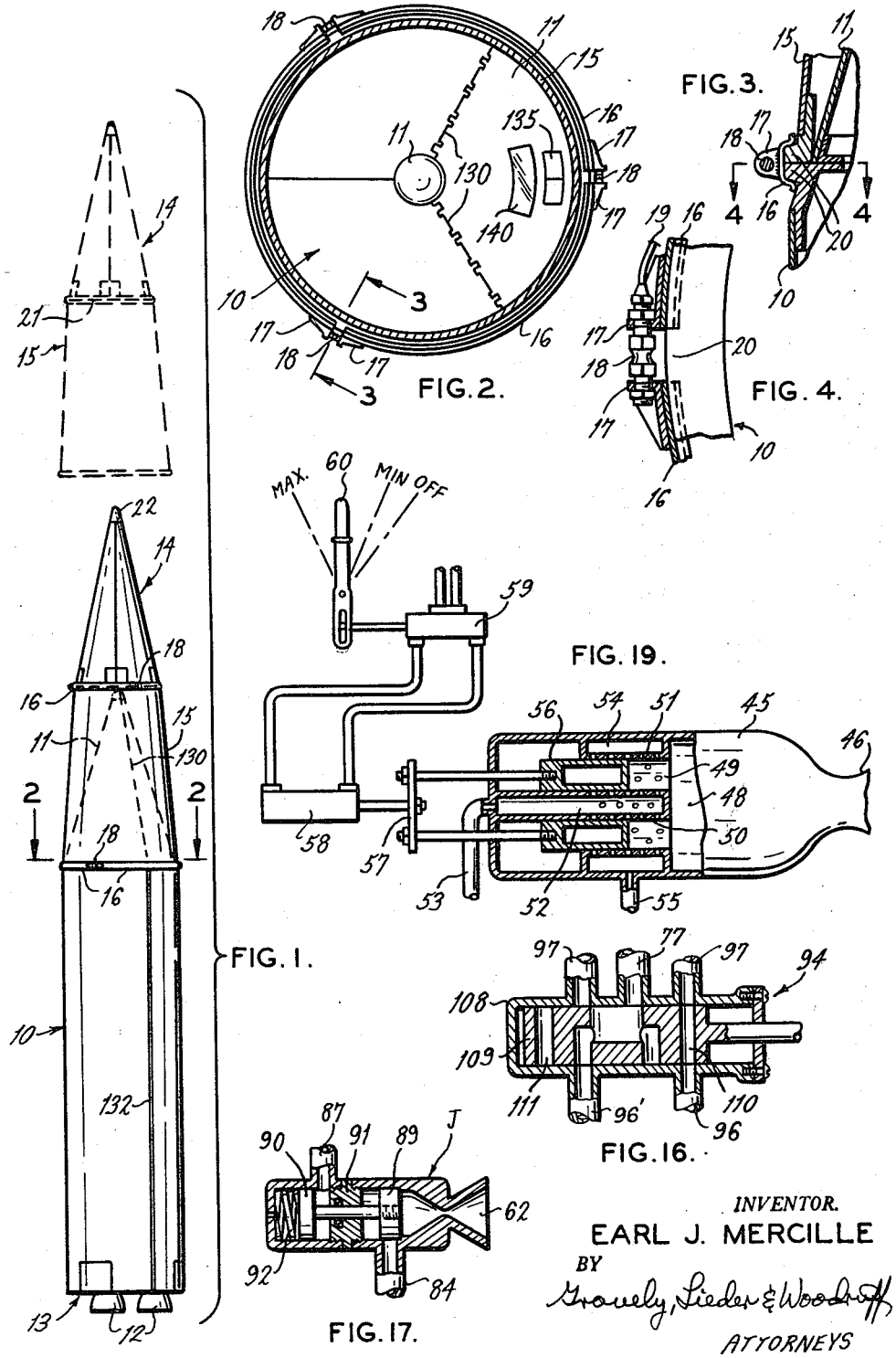
INVENTOR.
EARL J. MERCILLE
BY
Gravely, Lieder & Woodruff
ATTORNEYS

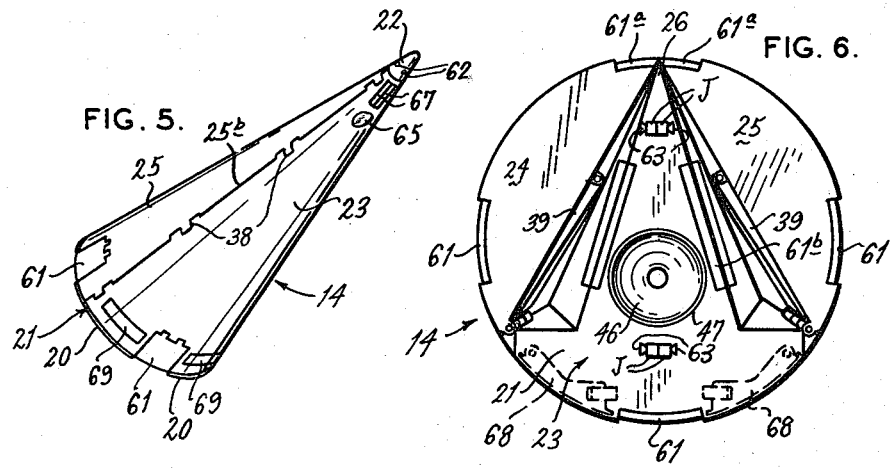

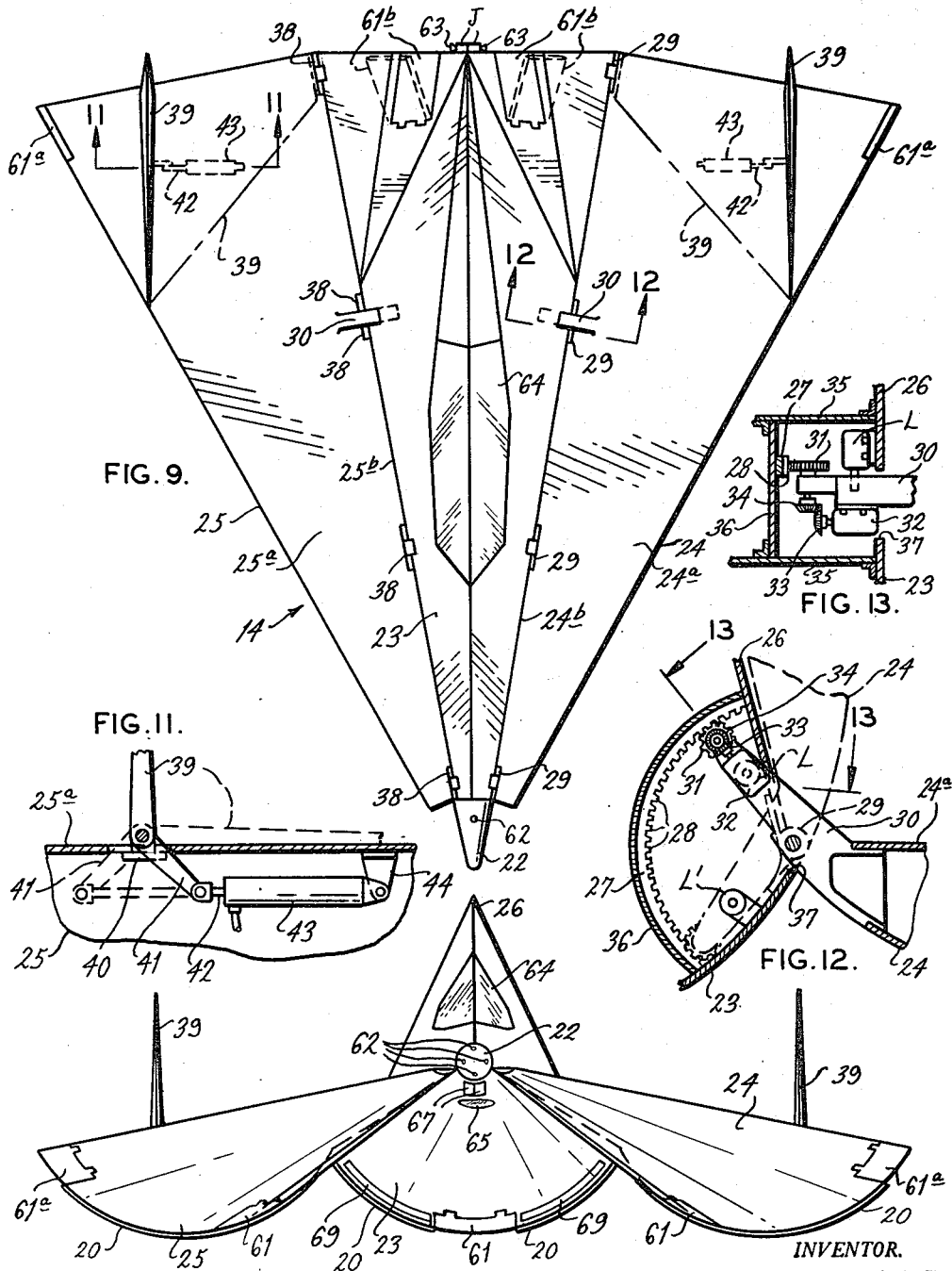

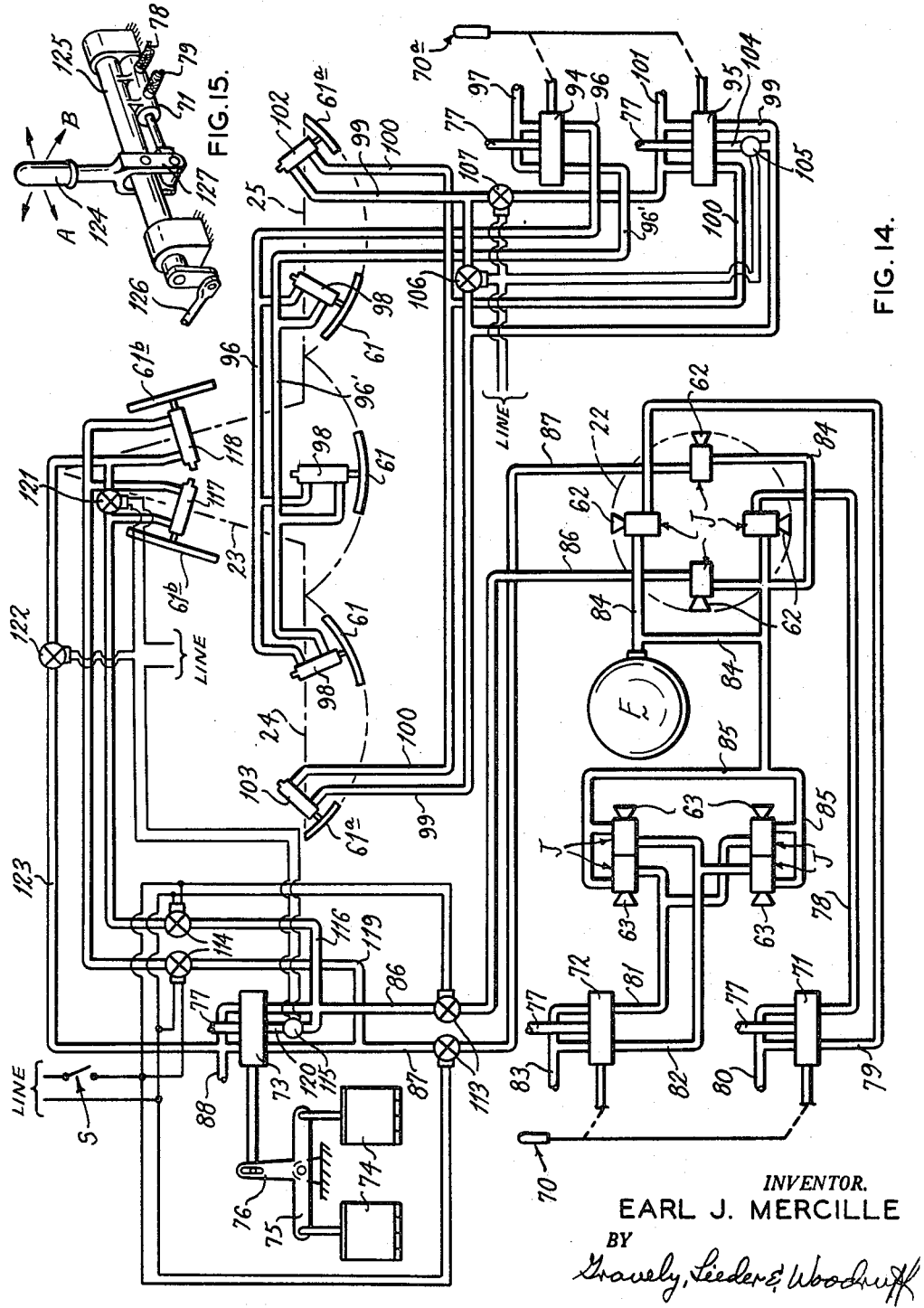

Sept. 8, 1964 E. J. MERCILLE 3,147,936
DUAL CONFIGURATION VEHICLE
Filed Sept. 27, 1960 5 Sheets-Sheet 5
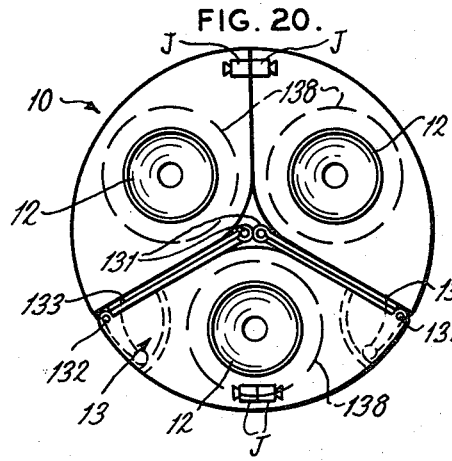
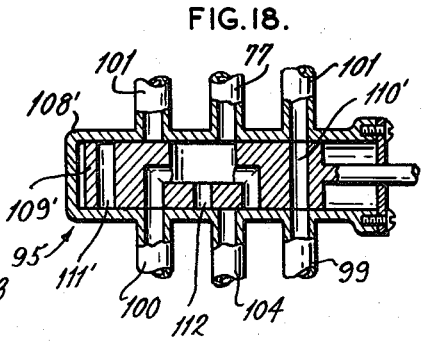
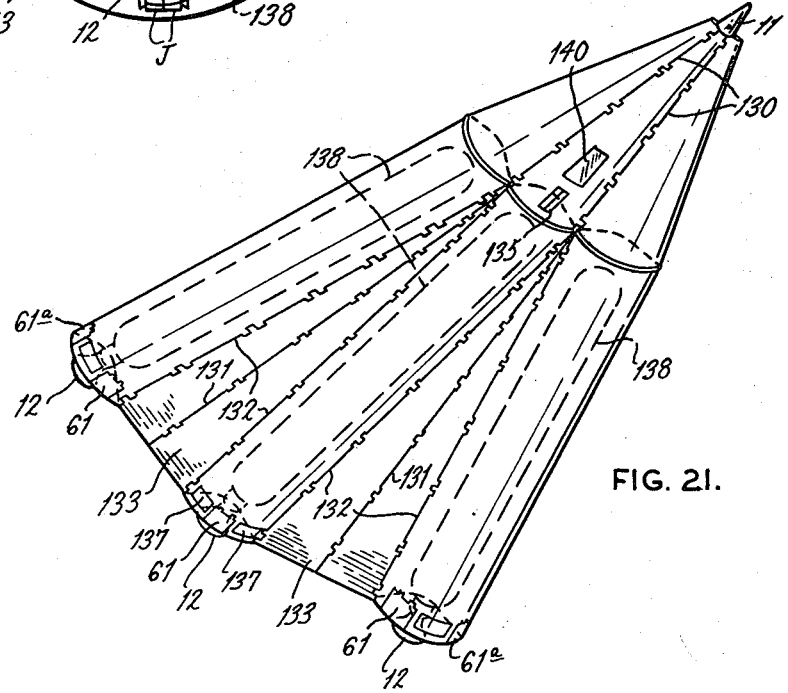
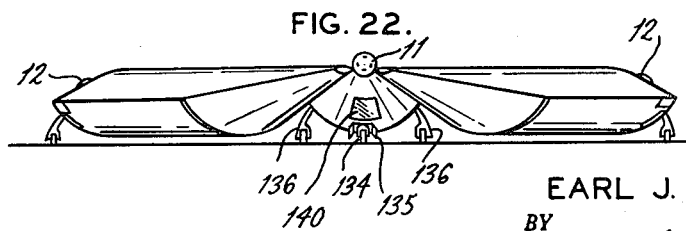
INVENTOR.
EARL J. MERCILLE
BY
Gravely, Lieder & Woodruff
ATTORNEYS United States Patent Office 3,147,936
Patented Sept. 8, 1964

3,147,936
DUAL CONFIGURATION VEHICLE
Earl J. Mercille, Creve Coeur, Mo., assignor to McDonnell Aircraft Corporation, St. Louis, Mo., a corporation of Maryland
Filed Sept. 27, 1960, Ser. No. 58,731
11 Claims. (Cl. 244—2)

This invention relates to vehicles which may be projected into space and be returned, and it is particularly concerned with recoverable vehicles under the control of a pilot and by means of simplified controls which are effective in and out of the earth's atmosphere.

The problems envisioned in man's conquest of travel in space outside the earth's atmosphere are many and varied. A great deal of information is needed to successfully achieve the goal of travel into space and manned return to earth without danger to personnel. Important information has been collected by unmanned vehicles, but the ultimate is to put man into space and return him successfully so that the experiences and reactions of man may be more fully understood and be revealed for evaluation. This is an entirely new field of endeavor about which little is actually known. Certain steps are being taken to put man into space and to return him under conditions which will insure safe return and the invention herein disclosed is directed toward that end with the idea of being able to recover all components for subsequent use.

A principal object of this invention is to provide a vehicle suitable for projection into space in the form of separable components which may be separated and returned under control to permit recovery intact.

It is also an object of this invention to provide a controllable vehicle having a configuration suitable for high speed travel and having a different configuration for low speed flight whereby the vehicle can be propelled into space and returned without destruction.

The present invention represents a new step in the effort to return man from space and it is an object to provide a recoverable vehicle which can successfully be projected into space in a suitable form or configuration to house personnel and permit a change of form or configuration suitable for return from space under the control of personnel housed therein.

A further object of this invention is to provide a vehicle which may be folded into a configuration suitable for high speed travel and unfolded into a configuration suitable for controlled travel at greatly reduced speed.

Yet another object of this invention is to provide a vehicle composed of several components which when coupled together form a rocket capable of projection into space and which when separated can be converted into controllable and flyable bodies for purposes of recovery and reuse.

Other objects of this invention will be set forth in connection with the description of certain forms of a dual configuration and recoverable bodies disclosed in the accompanying drawings forming a part of this specification. In general the vehicle herein shown comprises components constructed and arranged to be folded into compact configurations to withstand the heating effects of high speed travel. The invention consists also in the unique arrangement of a component launching vehicle which can be recovered after being boosted into space. The invention further consists in providing recoverable space vehicle bodies with a suitable compartment for a pilot, with wings or similar surfaces forming a part of the body configuration and foldable between positions enclosing a substantial part of the pilot's compartment and positions acting as flight surfaces, and a source of power to propel the body in manned flight. Other parts, components and elements will be pointed out in the following description, reference being had to the drawings, wherein:

FIG. 1 is a side view of the vehicle forming the subject matter of this invention, the same being folded into a compact body, and composed of a booster type parent or launching section and a separable and flyable section forming the nose of the launching section, the view showing the flyable section forming the nose in dotted outline after being separated;

FIG. 2 is a section taken at line 2—2 of the vehicle shown in full line in FIG. 1;

FIG. 3 is a fragmentary sectional detail taken at line 3—3 in FIG. 2;

FIG. 4 is a fragmentary detailed view seen at line 4—4 in FIG. 3;

FIG. 5 is a perspective view of the nose section of the vehicle shown in FIG. 1;

FIG. 6 is a rear elevational view of the nose section of FIG. 5 in its folded configuration;

FIG. 7 is a side elevational view of the nose section in its unfolded and flyable configuration;

FIG. 8 is a rear elevational view of the nose section when in unfolded configuration;

FIG. 9 is a top plan view of the vehicle shown in FIG. 8;

FIG. 10 is a front elevational view of the vehicle shown in FIG. 9;

FIG. 11 is a fragmentary sectional view of a typical mechanism for moving a flight stabilizer, the view being taken at line 11—11 in FIG. 9;

FIG. 12 is another fragmentary sectional view of a typical mechanism for moving a flight sustaining surface, the view being taken at line 12—12 in FIG. 9;

FIG. 13 is a fragmentary detailed view taken at line 13—13 in FIG. 12;

FIG. 14 is a schematic control system for the vehicle components of this invention, the same system being useful in some or all of the components as will appear;

FIG. 15 is a fragmentary perspective view of a typical control which appears in the schematic system;

FIG. 16 is a sectional view of a typical control valve of the control system;

FIG. 17 is a sectional view of a jet for controlling the vehicle in space travel;

FIG. 18 is a sectional view of another typical control valve of the control system;

FIG. 19 is a schematic and partially sectional view of a throttleable jet motor used with the nose section and other sections of the vehicle;

FIG. 20 is an end view of the launcher;

FIG. 21 is a perspective view from underneath the launcher section showing the same in its recoverable configuration; and FIG. 22 is a front elevational view of the launcher section in its recoverable configuration at landing.

The vehicle forming the subject-matter of this invention is shown in its folded configuration in FIGS. 1, 2, 5, 6 and 20, and in its unfolded configuration in FIGS. 7, 8, 9, 10, 21 and 22. In the form shown in FIGS. 1 and 5, the vehicle comprises an elongated cylindrical launcher or booster body 10 which has a conic nose section 11 (shown in dotted outline). The booster body 10 carries a plurality of rocket motors 12 exhausting from the base 13. A separable cone-cylinder body is carried by the booster body and comprises the conic section 14 and the cylindrical section 15. In FIG. 1 the separable body sections 14 and 15 are shown in separated position in dotted outline and in carried position in full line.

The vehicle illustrated in FIG. 1 is intended to show the preferred arrangement of sections 10, 14 and 15 in a simple form and no unnecessary limitation is to be inferred therefrom since the number of booster bodies 10 may be multiplied as desired in accordance with the following description, and equivalent sectionalized and separable bodies may be devised to accomplish the broad principles of the invention; that is to say, one or more launcher or booster bodies may be coupled together to form stages, or any of the known rockets, such as the Atlas, may be employed in combination with the separable body 14–15 to propel it into space. Furthermore, the launcher or booster body 10 may be expendable, as in the case of Atlas, or it can be recoverable as will be described in more detail in connection with FIGS. 1, 20, 21 and 22. In the case of the separable body 14, 15, the broad principle of the invention can be met by providing the conic section 14 with means to permit it to be recovered with or without the cylindrical section 15. However it is believed sufficient to point out that in the combination of FIG. 1 the section 15 is a connecting adapter to take care of the necessary change in contour between the body 10 and section 14, and as such form an expendable portion which is cast off at the appropriate time.

In use, the booster body 10 and sections 14 and 15 carried thereon are held in position by rupturable hoops or bands 16 (FIGS. 1, 2, 3 and 4) consisting of a plurality of channel-shaped parts having projecting ears 17 adjacently located and interconnected by explosive bolts 18 to which a suitable electrical firing cable 19 is connected. The bands 16 clasp cooperating beads or flanges 20 on the edges of the body walls. The explosive bolts 18 are fired simultaneously to disconnect the body sections 15 from the booster 10 first followed by the disconnection of the adapter section 15 from section 14 where the cylindrical section 15 is of the type to be discarded from the section 14. It can be appreciated that the vehicle is to be put into space travel prior to effecting separation of the sections 14 and 15. In so doing the body section 14 becomes a free space traveler and the booster body 10 is freed of its duty to propel the same and can be recovered since it is formed with a nose cone 11 for that purpose. When several booster bodies 10 are employed, each is connected to the adjacent body by means similar to section 15 and the rupturable hoop means 16 is employed as before described.

Turning now to FIGS. 5 to 10 inclusive, it can be seen that the body section 14 which forms the nose of the composite vehicle has a conic configuration with a circular base wall 21 and a nose piece 22. This body is divided into segments 23, 24 and 25 of which segment 23 is the fuselage of a flyable delta-wing aircraft and segments 24 and 25 constitute the wings. The respective segments have arcuately shaped outer surfaces (FIGS. 8 and 10), the fuselage is triangular shaped and rises to an apex 26, and the wings have relatively flat upper surfaces 24a and 25a respectively. The conic shape of the body section 14 possesses the desired basic configuration from which a winged delta-type aircraft can be evolved by unfolding the wing segments as shown in FIGS. 7, 8, 9 and 10. The evolution is accomplished by forming convergent hinge lines 24b and 25b at approximately the one third points of the circumference of the circle near the outer surface and along the slant of the fuselage segment 23 converging toward the nose piece 22. Additional volume and useable space can be obtained along with improved aerodynamic wing section by using the cylindrical or nearly cylindrical section 15 which has the same circular form as the base wall 21 of section 14 and forms a continuation of the folded cone. The cylindrical section 15 is also split into one third segments and open to give an even greater wing span such as is shown in FIG. 21. The opening of a cylindrical section at the one third hinge lines creates an open V space aft of the cone base wall 21 and the open spaces can be closed (as in FIG. 21) by a folding web which can be a structural support for the cylindrical segments or can be only a fairing means with all loads carried through the segments to the hinge lines and wing locking means to be described.

A dual configuration vehicle 14 of this invention initially assumes the form shown in FIGS. 1 and 5 for propulsion by the booster body 10 into space, whether it be within the earth's atmosphere or beyond. The initial folded configuration is adapted to present substantially only the nose piece 22 to the heating effect of high velocity, and the arcuate outer surfaces extending aft to the circular base wall 21 provide a smooth configuration free of any fixed projecting means. A vehicle having fixed wings is obviously confronted with heating effects on the leading edges of the wings and at the nose of the fuselage. This is not suitable for extremely high velocity such as is obtained from the booster body 10.

The means for unfolding wings 24 and 25 is shown in FIGS. 9, 12 and 13 in connection with the wing 24. It is understood that the wing 25 has similar means which need not be described in detail. In FIG. 12 the body 14 has a structural skin sheath forming the outer surface and a fuselage skin 26. These surfaces carry an arcuate rack 27 having a series of teeth 28 on the inner curved side. One of the hinge assemblies 29 is constructed to provide a pivot for a crank arm 30 carried by the structure of the wing 24. The inner end of the arm 30 carries a gear wheel 31 which engages the rack teeth 28, and the gear wheel is driven by motor means 32, in turn, driving a shaft on which a bevel gear 33 is mounted to engage a bevel gear 34 fixed to the shaft of the gear wheel 31. The full line disclosure in FIG. 12 shows the wing 24 in extended position, and the parts shown in broken line illustrate the wing 24 when folded to enclose the fuselage skin 26. In FIG. 13, the wing unfolding means is shown mounted in a compartment of the body 14 formed by the ribs 35 and a transverse wall 36. The ribs are attached to the skin and the latter is formed with a slot 37 to accommodate the arm 30. The opposite wing 25 is similarly unfolded about the hinge means 38. As shown in FIGS. 12 and 13, a suitable wing locking device L is mounted in the compartment housing the wing unfolding means in position to project a locking pin into an aperture of the arm 30 when the wing has been extended. A similar locking device L' (FIG. 12) is employed to lock the arm 30 in wing retracted position.

Turning now to FIGS. 8 and 9, and to FIGS. 6, 7 and 10, it can be seen that each wing carries a stabilizer fin 39 which moves from the folded position FIG. 6 to the erect position of FIGS. 7 and 9. A typical mechanism for unfolding the fins 39 is shown in FIGS. 9 and 11 associated with wing 25, but the same mechanism is also in wing 24. As seen in FIGS. 6 and 11, the fin 39 is pivotally mounted in a suitable hinge member 40 carried by the inner surface 25a of wing 25. The hinge includes a crank arm 41 connected at its inner end to the thrust rod 42 of motor means 43, the motor means being pivotally supported by a bracket 44 at its base end. The thrust rod 42 is movable between the dotted line position with the fin 39 folded to the full line position with the fin 39 unfolded and erect.

As seen in FIGS. 6, 7 and 8, the body 14 is provided with throttleable thrust producing motor means 45 (FIG. 19) in which the nozzle 46 opens at the aft wall 21 in an exhaust aperture 47. A suitable fuel supply may be carried in the fuselage 23 behind a fire wall 21' or in the wings 24 and 25. The motor means 45 has a reaction chamber 48 communicating with an annular fuel inlet chamber 49 in which the inner wall 50 and the outer wall 51 are perforated as shown. Wall 50 defines a central fuel feed header 52 supplied by a conduit 53, and wall 51 defines an annular fuel feed header 54 supplied by a conduit 55. A control plug of annular form 56 is slidably mounted in the annular chamber 48 and is motivated by a rod and yoke device 57 connected to a motor 58. In turn, the motor 58 of hydraulic type in this instance is subject to control by a suitable valve 59 actuated by a pilot operated lever 60 which is movable between the off position and any selected position up to maximum thrust. In the motor means 45 shown, two different fuels are supplied at conduits 53 and 55 and upon commingling in the inlet chamber 49 spontaneously react to produce the desired thrust reaction at nozzle 46.

Directional control for the vehicle is of two types. One is by the employment of small tabs or movable surfaces spaced around the periphery of the body 14 adjacent the aft wall 21 when in folded configuration. These surfaces, of course, array themselves on the end walls of the respective wings 24 and 25 and on the fuselage 23. In the folded configuration of the vehicle the surfaces 61 are disposed in the horizontal and vertical axes, the surface 61a at the apex 26 being divided, part being on each of the wings. The surfaces 61 may be moved individually or in combination to directionally control the vehicle. Thus in the unfolded configuration the divided surfaces 61a (FIGS. 6 and 8) are disposed to function as ailerons and the other surfaces 61 are for pitch control. In addition yaw control is obtained by alternately extendable flaps 61b movably mounted in the sides of the fuselage segment 23 near the aft wall 21 (FIGS. 6 and 8).

The other means for control of the vehicle is in the form of pitch and yaw control jets issuing from small vents or apertures 62 in the nose cone 12 (FIGS. 5, 7 and 9). Other jets 63 carried on the base wall 21 (FIGS. 6, 7 and 8) control roll of the body 14. The apertures 62 are part of jet devices J (FIGS. 14 and 17) connected with a suitable source F of fluid under pressure. The discharge of a small blast of fluid at one or more of the apertures 62 will rapidly push the nose cone 12 in the reaction direction, such as for pitch and yaw control, and roll control is obtained by jets released at opposite pairs of jets 63, all as will be described in FIGS. 14 and 15.

A pilot is housed in the fuselage segment 23 ahead of the fire wall 21' in a pressurized capsule, but no detailed explanation of the necessary means to accommodate a pilot is believed necessary. It is, of course, necessary to provide an enclosure which can be pressurized, and to incorporate a canopy 64 as well as a visibility port 65 which is connected with the pilot's compartment to afford sight in the down direction.

Recovery of the vehicle is aided by a landing system consisting of skids or of nose wheel gear 66 foldable into the body at fairing doors 67, and main wheel gears 68 foldable into the body at fairing doors 69. The landing system is carried by the body 14 and opens from the arcuate under surface of the fuselage segment 23 as best seen in FIGS. 5 and 7. Though not shown, outrigger means may be mounted in each wing 24 and 25 to provide for greater stability in landing.

The control of the dual configuration body 14 is schematically shown in FIG. 14, and details of parts of the system have been disclosed in FIGS. 15, 16, 17 and 18 to which reference will be made in describing the schematic system. As seen in FIG. 7 the pilot has manual controls such as the one at 70 which is movable to effect control of the body, and a similar control 70a is provided on the other side of the pilot. It is of course understood that a number of different control devices and arrangements thereof can be provided so that the simplified system herein disclosed is not to be taken as limiting the selection and use of such controls.

The device at 70 is shown in FIG. 15 and the same showing will also apply to the device 70a. Let it be understood that the device 70 is selected to control the craft while in space and the device 70a will control the same for recovery. The need for control will first be felt in space while the body is in its folded configuration and travelling at great speeds. Orientation of the body 14 in space is by pitch, yaw and roll and the control 70 is operably coupled to control valves 71 and 72 which produce pitch and roll effects. The valve 73 controls yaw and is subject to foot response of the pilot through pedals 74, a rocking member 75 and the crank arm 76. In the case of the pitch control valve 71, motive fluid is supplied at conduit 77 from a suitable source and flows to either of two conduits 78 and 79, the conduit 78 being connected to the bottom jet 62 and conduit 79 being connected to the top jet 62. These jets it will be remembered are located in the nose piece 22. When conduit 78 is being supplied, conduit 79 acts as a discharge. Therefore, a motive fluid exhaust line 80 is connected into the valve 71. Valve 72 is similarly constructed and controls roll since conduits 81 and 82 are connected to opposed ones of the roll jets 63. The valve 72 has a motive fluid exhaust line 83 which exhausts either conduit 81 or 82 when the other is a supply line. The jets J are all supplied with a fluid from the common source F by a system of supply conduits 84, and continuation conduits 85. The yaw control valve 73 has the motive fluid supply conduit 77 and the conduits 86 and 87 connected to opposed horizontal one of the jets 62. The exhaust from valve 73 is a header 88.

It can now be seen that the pilot by moving the control device 70 selectively or conjointly regulates valves 71 and 72 for pitch and roll, and by foot response at pedals 74 he can regulate valve 73 for yaw. Each of the control functions in pitch, roll and yaw is produced by the appropriate jet J. A typical jet J is shown in FIG. 17 and comprises a hollow body having the nozzle exhaust, say 62 at the right side of the nosepiece 22 in FIG. 14. The jet fluid from source F is fed in at conduit 84 and is controlled by a piston 89. The piston 89 has a motor piston 90 connected to it through the dividing wall 91. The piston 90 is urged to the right to cut off the jet fluid by a spring 92, and is urged to the left by the fluid in conduit 87 from valve 73. This is typical of all of the jet devices J and no further description need be given.

The control 70a for recovery is arranged to selectively or conjointly operate pitch and roll control valves 94 and 95 respectively. The valve 94 is supplied with fluid at conduit 77, as previously pointed out, and this fluid is directed to either conduit 96 or 96', the unselected conduit being a return line to the exhaust header 97. The conduit 96 supplies fluid to each of three motors 98 which extend control surfaces 61 for pitch control, and conduit 96' supplies the same motors 98 to retract these surfaces 61. The valve 95 supplied with fluid at conduit 77 feeds conduits 99 and 100 selectively, the one not so selected being a return line to the exhaust header 101. Conduit 99 supplies fluid to a right hand motor 102 on wing 25 to extend the aileron surface 61a and to a left hand motor 103 to retract the associated aileron surface 61a on the wing 24. The other conduit 100 is connected to motor 102 to retract the aileron 61a and to motor 103 to extend the aileron 61a. In the configuration when folded the ailerons 61a need to be retracted simultaneously and to accomplish this the valve 95 is provided with an auxiliary conduit 104 containing a pressure responsive switch and one-way valve 105 which allows flow to the line 99. The switch 105 activates a normally open solenoid valve 106 to close the same, and it also activates a normally closed solenoid valve 107 to open the same so that conduit 99 now opens to conduit 101 at the valve 107. Thus, both aileron motors 102 and 103 are caused to retract simultaneously since the pressure fluid in auxiliary conduit 104 passes to conduit 99 which retracts the left aileron 61a and the return fluid from its motor 103 flows along conduit 100, but is blocked at valve 95 and is thereby caused to flow into motor 102 to retract the same. The exhausted fluid from motor 102 now flows through the solenoid 107 and to header 101.

At this point, a typical valve, such as valve 94 is shown in section in FIG. 16. It is understood that valves 71 and 72 are similar. Valve 94 has a ported housing 108 and a movable plunger 109 therein such that the supply conduit 77 may feed either conduit 96 or 96'. In the view of FIG. 16, conduit 96' is in communication with feed line 77. This allows the other conduit 96 to have communication through passage 110 with the exhaust header 97. When the plunger 109 is shifted to the right, the conduit 96' communicates through passage 111 with the header 97. In FIG. 18 there is shown a valve similar to those at 73 and 95. The valve shown is at 95 in FIG. 14 and includes all of the details described for the valve 94 of FIG. 16, and the equivalent parts are pointed out by the same reference numerals primed. The difference of valve 95 over valve 94 resides in the provision of an auxiliary passage 112 in the piston 109' controlling feed to the auxiliary conduit 104. When passage 112 is open to conduit 104, conduits 99 and 100 are blocked so that fluid exhaust must be rerouted as explained.

In FIG. 14, the operation of valve 73 in response to foot control at pedals 74 has to be explained. However, the valve 73 is also used to control the flaps 61b for yaw control on recovery in the following manner. The conduits 86 and 87 to the jets 62 for yaw control contain identical types of normally open solenoid valves 113 so that when seeking to control the flaps 61b the conduits 86 and 87 can be closed by closing the switch S in the electrical line. Switch S is a flight mode control; that is when open the vehicle is responsive to the control jets J for space travel, and when closed the vehicle is responsive to aerodynamic surfaces 61b. When switch S is closed the normally closed identical solenoid valves 114 are energized to open positions, while the solenoid valves 113 are closed. With valves 113 closed and valves 114 opened the flow in conduit 86 is diverted into branch conduit 116 which connects with the retracting side of actuator motor 117 connected to flap 61b, and also connects with the extending side of actuator motor 118 for flaps 61b at the opposite side. Conduit 87 is also closed so that flow is diverted to branch conduit 119 which connects to the extending side of motor 117 to extend flap 61b, and also connects to the retracting side of motor 118 to retract the flaps 61b. The flaps 61b are differentially movable in the foregoing arrangement and are controlled by the setting of the valve 73 under pedal control.

In the folded configuration of the body 14, the flaps 61b must be retracted simultaneously. To do this, the auxiliary conduit 120 contains a one-way pressure responsive valve 115 which opens to conduit 116, but the response at valve 115 serves to close a normally open solenoid valve 121 and to open a normally closed solenoid valve 122. Now the fluid circuit to flap motors 117 and 118 is so altered that both flaps 61b are retracted together, the operation and flow being similar to that described for the ailerons 61a and valve 95. When valve 122 is opened the flow of fluid exhausts through conduit 123 to the header 88.

Turning to FIG. 15, the manual control shown is used at 70 and 70a in FIG. 14 to control the valves 71, 72 conjointly or separately and for controlling the valves 94 and 95. Since the pilot's hand motion at the handle 124 is fore and aft, as along arrow A, as well as side-to-side along arrow B, the device has been constructed to give undistorted action in either direction A or B. This is simply done by mounting the rock shaft 125 in fixed bearings and attaching the push-pull rod 126 to the shaft such that rod 126 can move the plungers 109 or 109' in the valves 72 and 95 respectively. The rock shaft motion in the direction B is selected to govern roll reaction, and the motion of handle 124 in the direction A operates the valves for pitch such as valves 71 and 94 which are carried directly upon the rock shaft 125, as at 71. In this case the handle yoke 127 is connected to the plungers 109, as before noted.

Turning now to the views in FIGS. 20, 21 and 22, the booster body 10 is longitudinally hingedly divided into one third segments of a solid cylinder, and tapered or converging hinge lines 130 are formed in the conical nose portion 11. The hinge lines 130 project into the cylindrical portion at lines 131, but since the cylindrical portions have parallel lines of fold, the hinge lines 132 which follow the cylinders converge toward the zone where the change from cylindrical to conic section occurs. The resulting V-shaped gap is closed by a foldable web 133 so that a better aerodynamic section is obtained. The views of FIGS. 21 and 22 show the outer cylindric and conic surfaces as the under surfaces of the winged aircraft. Landing gear is carried in the fuselage segment such that the nose gear 134 is folded up behind the closure doors 135, and the main gear 136 is folded up behind the doors 137. The means for unfolding the wing segments is the same as shown and described in FIGS. 12 and 13, and has not been illustrated in the views of FIGS. 20 and 21 since its function and operation has already been described. In the configuration of the booster vehicle 10 or of the separable aircraft 14, the wing segments can be locked in folded positions by the plunger Lock L' (FIGS. 12 and 13) engaging the fold arm 30 at the lock aperture therein. A second plunger lock L engages the same aperture in fold arm 30 when in its wing extended position. Such provisions are incorporated in the booster body to secure the wings in extended positions and to prevent wing unfolding until desired.

The booster body is provided with a rocket motor 12 in each segment, and the fuel is carried in elongated tanks 138. Control of the booster body in space is by a pilot housed in the conic section 11 and indicated at the canopy 140. On recovery, the booster is controlled in atmosphere by the pitch surfaces 61 and ailerons 61a. Yaw control surfaces, not shown in FIGS. 21 and 22 are mounted on the sides of the fuselage segment, as has been shown in FIG. 9. It is clear that the craft of FIG. 21 can be controlled by the several means already described in FIG. 14 for both space travel and for recovery.

The foregoing description has related to certain preferred forms of this invention which will attain the broad objectives of putting a manned body or craft into space in a configuration suitable for that mode of navigation and recovering the craft by changing its configuration at the desired time. It has been disclosed and described how the craft can be composed of an elongated stack of bodies releasably connected and one or all provided with control means to achieve manned flight in space and recovery. It has been made to appear that the leading section of the composite vehicle may be a conic body or it may be a cone-cylinder body, and that such body has a full and adequate complement of controls and throttleable power means to make such navigation into space and recovery entirely possible. Certain refinements will, of course, be evolved in respect of the vehicle and its parts and components herein disclosed as this specification is more fully understood. However it is intended that all such refinements, modifications and changes shall be included within the broadest possible scope of the appended claims.

What is claimed is:

1. A dual configuration vehicle comprising a body tapering forwardly from a circular base wall and ending in a nose piece, flight sustaining wings foldably connected to said body along fold axes extending from adjacent said nose piece to said base wall along the surface of said body taper, and means to fold and unfold said wings, said wings in folded positions enclosing a substantial portion of said body and providing a substantial portion of the exterior surface of said body, said wings fairing into said nose piece to form a highly streamlined vehicle for high speed flight and in unfolded positions forming a low speed flyable vehicle.

2. A dual configuration conic vehicle comprising a body, wings hingedly connected to said body and movable about hinge axes located lengthwise of the conic surface of said body, said wings being movable from positions folded about said body to positions extended at opposite sides of said body in flight sustaining positions, said body and wings having exterior surfaces each of which comprise substantially one-third of the conic surface of said vehicle, said body and wings in folded positions forming a substantially cone-shaped vehicle and in unfolded positions of said wings forming a delta-wing vehicle.

3. A composite vehicle comprising a booster body including a plurality of sections foldably connected to form a high velocity missile in folded configuration, motor means in each section to propel said booster body, means to unfold said booster body sections and form a winged aircraft, a separable body releasably mounted on said booster body and including a plurality of sections foldably connected to form a high velocity missile in folded configuration, motor means in said separable body to propel the latter independently of said booster body, and means in said separable body to unfold said sections to for a winged aircraft, said bodies being recoverable in winged aircraft form.

4. A recoverable dual configuration vehicle comprising a booster body and a body mounted on said booster body, said bodies cooperatively constituting a high velocity vehicle, each of said bodies having sections foldably connected for high velocity flight, means in each body to unfold said sections into winged configurations, and control means in each body operable to effect flight control in said winged configuration for recovery of said bodies.

5. A recoverable dual configuration vehicle comprising a booster body section having propulsion motor means therein, a separable body section mounted upon said booster body section, said booster and separable body sections being propelled by said motor means as a composite vehicle, each of said body sections including foldably connected segments which when unfolded form delta-wing configurations, separate motor means in said separable body section to propel the latter independently of said booster body section, and means in said body sections to unfold said connected segments and form the delta-wing configurations.

6. A recoverable space travel vehicle comprising a rocket propelled booster section of cylindrical configuration, a nose section of conic configuration, means releasably connecting said nose section to said booster section, said sections in connected relation forming a missile-like vehicle for travel into space, each of said sections including folded segments, means to release said nose section from said booster section, and means to unfold said segments in each section and convert the same into flyable delta-wing configurations for recovery from space travel.

7. In combination a booster body of cylindrical configuration and having segments each consisting of substantially one third of the cylindrical body, a conic nose section on said cylindrical body having segments each consisting of substantially one third thereof, means hingedly connecting said nose cone segments, each of said nose cone segments being connected to a segment of said cylindrical body, whereby on unfolding of said nose cone segments said cylindrical body segments unfold forming V-shaped spaces therebetween, foldable web means interconnecting said cylindrical body segments and substantially filling said V-shaped spaces, said nose cone and cylindrical body segments in unfolded relation forming airfoils, propulsion motor means carried by said cylindrical body segments, and control means on said airfoils rendering said booster body flyable as an aircraft.

8. In combination a conic body having a nose and an axially spaced circular base, said body including a plurality of segments defined by parting lines extending from said nose along the slant surface of said conic body to said circular base, hinge means connecting said segments along said slanting parting lines, means to unfold said hingedly connected segments and convert said conic body into a delta-winged aircraft with said segments in side-by-side relation, means on said conic body providing controls to render said body selectively controllable in its conic configuration and in its winged aircraft configuration, a booster body connected to said conic body, motor means in said booster body to propel said bodies into space, and means to break the connection between said bodies releasing said conic body for unfolding to the delta-winged aircraft.

9. A foldable dual configuration vehicle for propulsion into space in folded configuration and unfoldable for recovery as a glider, said vehicle including a fuselage segment having a nose piece and divergently tapering afterwardly to a base wall, said fuselage segment having a semi-circular outer surface on its under side, a pair of similar wing segments hingedly connected to opposite tapered margins of said fuselage segment and extending in side-by-side relation with said fuselage segment, said wing segments having semi-circular outer surfaces and being foldable to enclose a substantial portion of said fuselage segment and form with said fuselage segment a conic configuration in which said semi-circular outer surfaces together form the outer surface of said vehicle when in its conic configuration, and means operably connected to said wing segments to move the same relative to said fuselage segments to unfolded configuration in side-by-side relation with said fuselage segment to form a delta-winged glider.

10. The vehicle set forth in claim 9, wherein said fuselage segment has a triangular shaped portion forming a pilots capsule with a canopy thereon, and said wing segments in folded configuration enclose said pilots capsule and canopy and lie adjacent said triangular shaped portion.

11. The vehicle set forth in claim 10, wherein said outer semi-circular surfaces of said segments form substantially one third of said conic configuration with said segments folded.

References Cited in the file of this patent

UNITED STATES PATENTS

| | | |
|---|---|---|
| 1,448,166 | Strong | Mar. 13, 1923 |
| 2,596,436 | Robert | May 13, 1952 |
| 2,977,080 | Zborowski | Mar. 28, 1961 |
| 3,065,937 | Vigil | Nov. 27, 1962 |

FOREIGN PATENTS

| | | |
|---|---|---|
| 120,476 | Great Britain | Nov. 14, 1918 |

OTHER REFERENCES

Aviation Week, vol. 70, No. 1, page 18, Jan. 5, 1959.
Aviation Week, page 96, Nov. 2, 1959.